United States Patent [19]

Werjefelt

[11] Patent Number: 5,202,796
[45] Date of Patent: Apr. 13, 1993

[54] EMERGENCY VISUAL ASSURANCE APPARATUS FOR AN AIRCRAFT COCKPIT

[76] Inventor: Bertil Werjefelt, P.O. Box 5011, Kaneohe, Hi. 96744-5011

[21] Appl. No.: 865,430

[22] Filed: Apr. 9, 1992

[51] Int. Cl.$^5$ ............................................. G02B 27/00
[52] U.S. Cl. ................................. 359/894; 244/118.5
[58] Field of Search ...................... 359/894; 244/118.5, 244/129.2; 128/201.28, 201.15, 201.25, 201.23

[56] References Cited

U.S. PATENT DOCUMENTS

| | | | |
|---|---|---|---|
| 4,552,140 | 11/1985 | Cowley et al. | 128/201.25 |
| 4,552,325 | 11/1985 | Bruensicke | 244/118.5 |
| 4,559,939 | 12/1985 | Levine et al. | 128/201.28 |
| 4,710,756 | 12/1987 | Thornburg et al. | 244/118.5 |
| 4,832,287 | 5/1989 | Werjefelt | 244/118.5 |

OTHER PUBLICATIONS

Vision Safe Corporation, "Vision Safe Assures You Vital Visibility Even in the Thickest Smoke!" Brochure 1987.
Vision Safe Corporation, "E.V.A.S.-Emergency Vision Assurance System" Brochure 1990.
Guy Norris, "Smoke-Free Vision Approved", Flight International, p. 16, 22 Jan. 1991.
Volker Leuchsner, "Rauchfreie Zone", Flug Revue, pp. 32-33, Mar. 1992.
"Cockpit's Vision Tunnel", Popular Mechanics, p. 25, Apr. 1992.
Kieran Daly and Graham Warwick, "US Companies Close to Vision System Deal", Flight International, p. 5, 11 Feb. 1992.

Primary Examiner—Loha Ben
Attorney, Agent, or Firm—Shlesinger, Arkwright & Garvey

[57] ABSTRACT

An emergency visual assurance apparatus for an aircraft cockpit comprises an inflatable enclosure having inflated and deflated states. The enclosure is adapted to fill the visual path between a pilot and an instrument panel and/or a windshield of an aircraft when in the inflated state. The inflatable enclosure includes windows for permitting the pilot to see through the enclosure, thereby enabling the pilot a clear path of visibility to the instrument panel and/or the windshield during a smoke emergency in the cockpit. A blower is provided for inflating the inflatable enclosure with transparent fluid during an emergency to maintain the visual path between the pilot and the instrument panel and/or the windshield. A separable member is associated with the blower such its removal activates the blower.

24 Claims, 6 Drawing Sheets

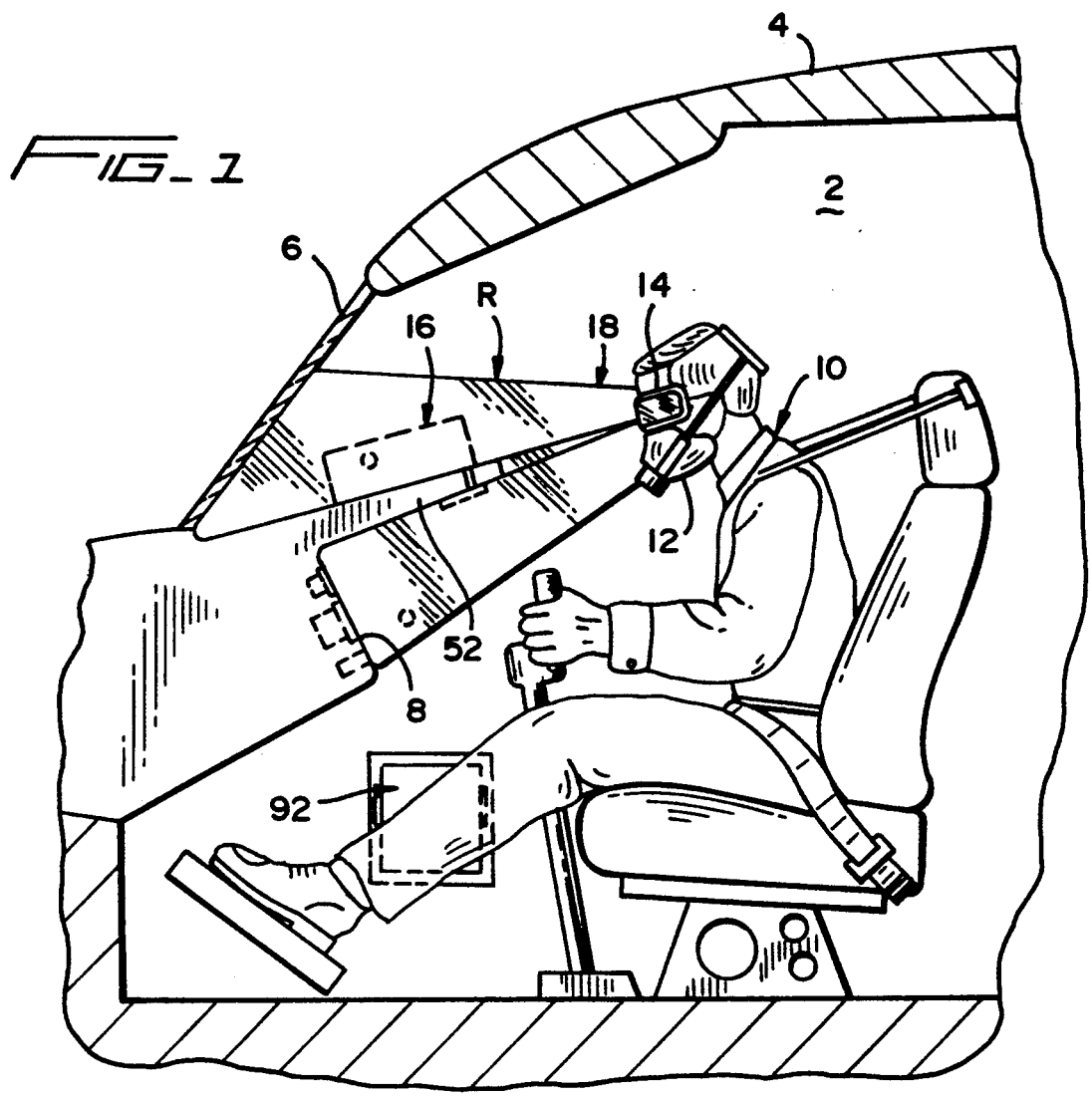
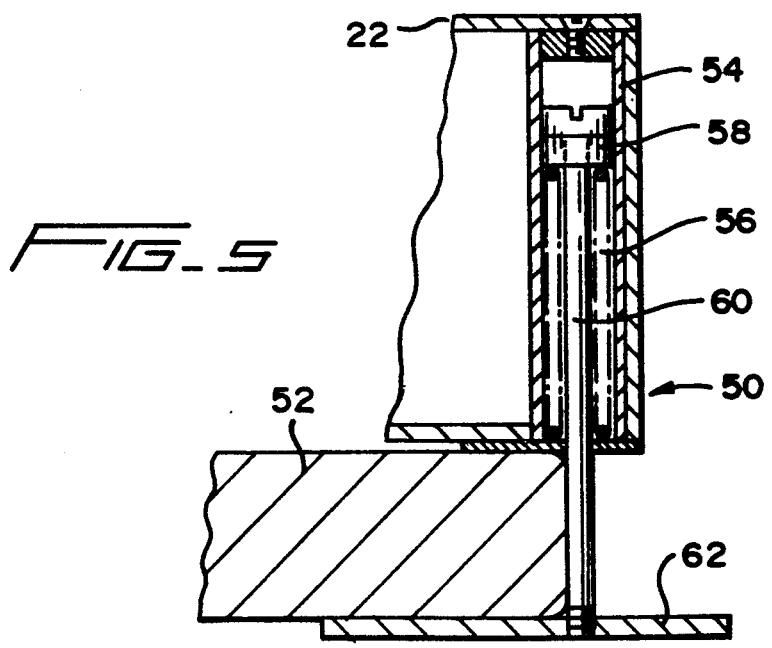

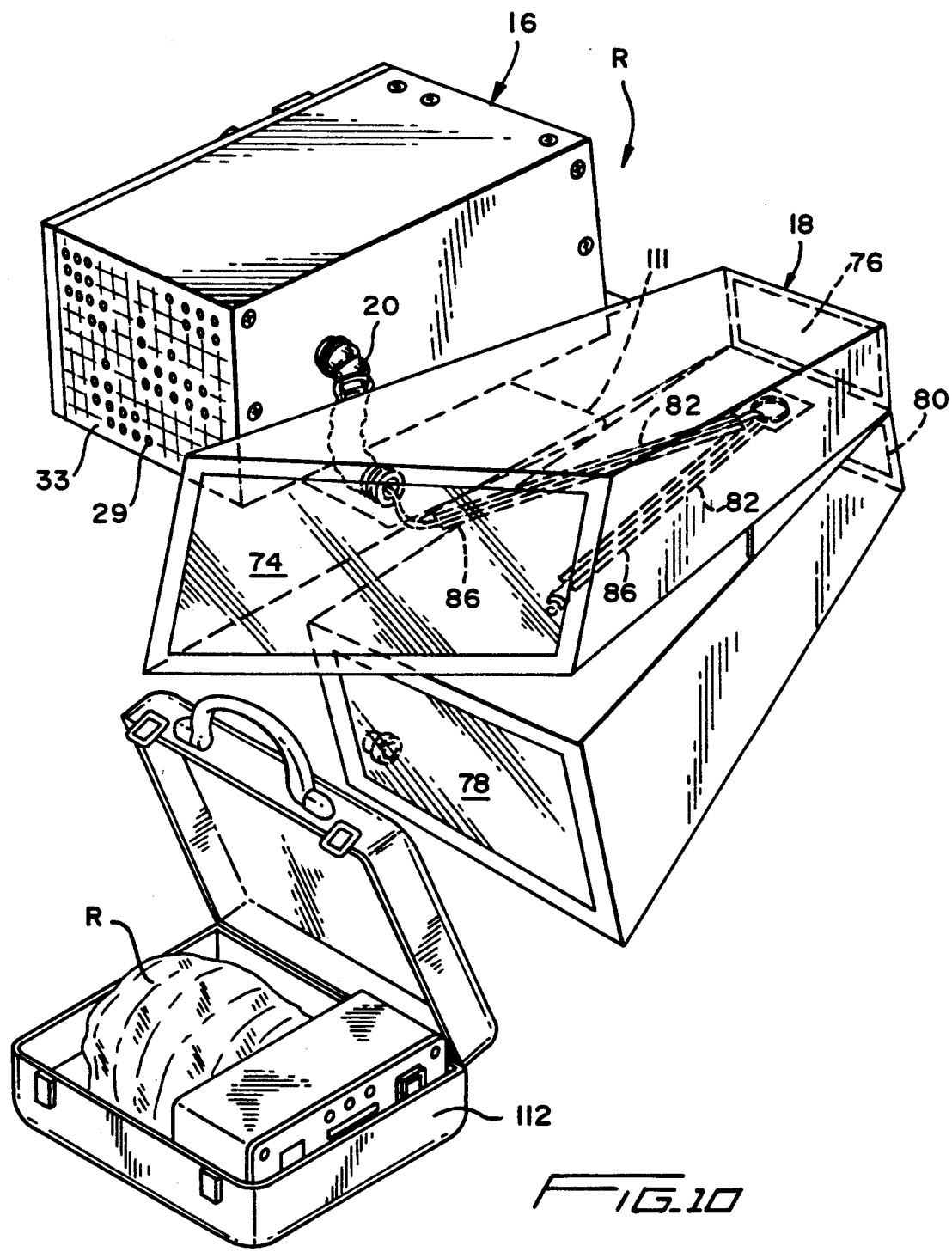

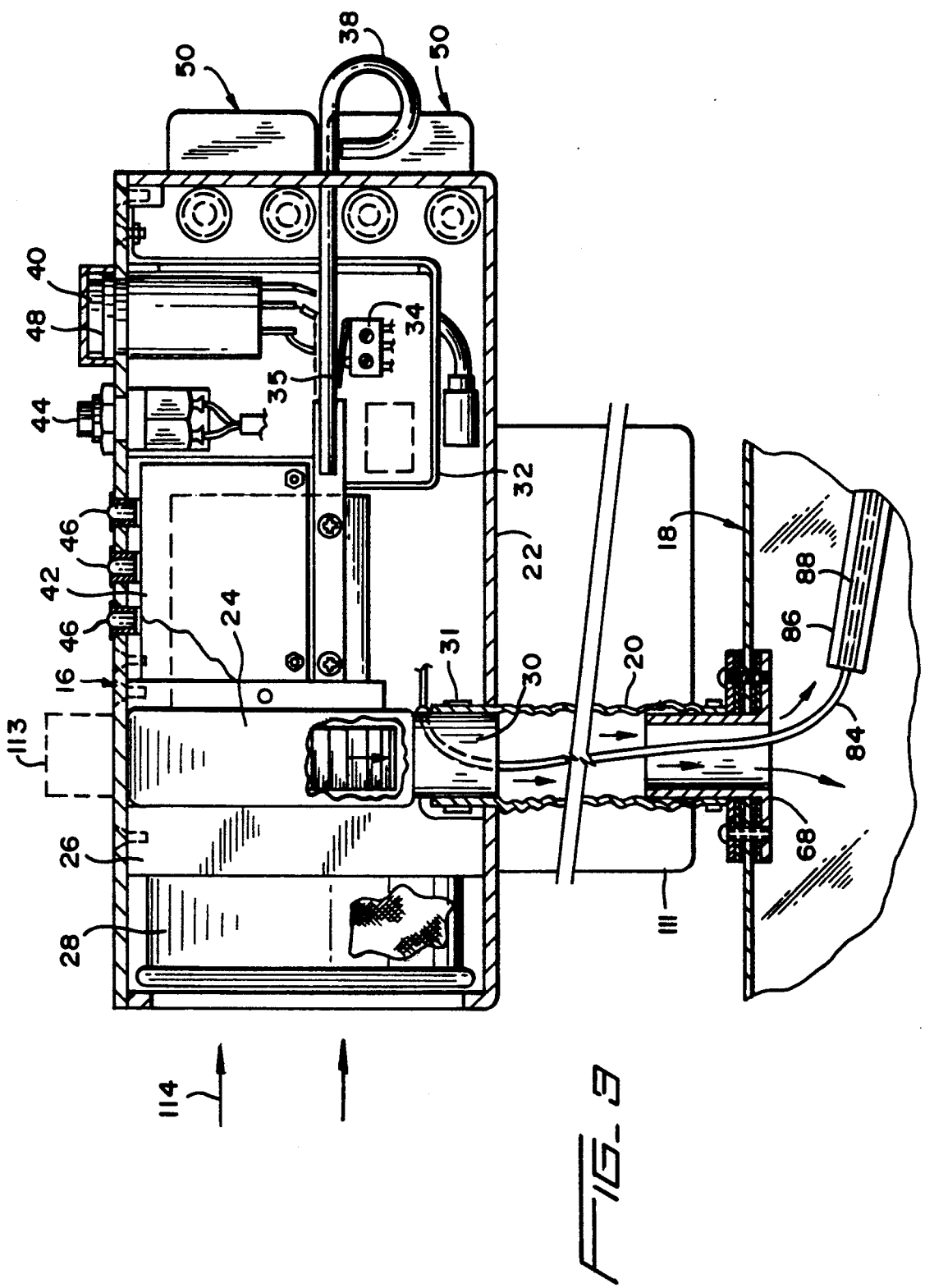

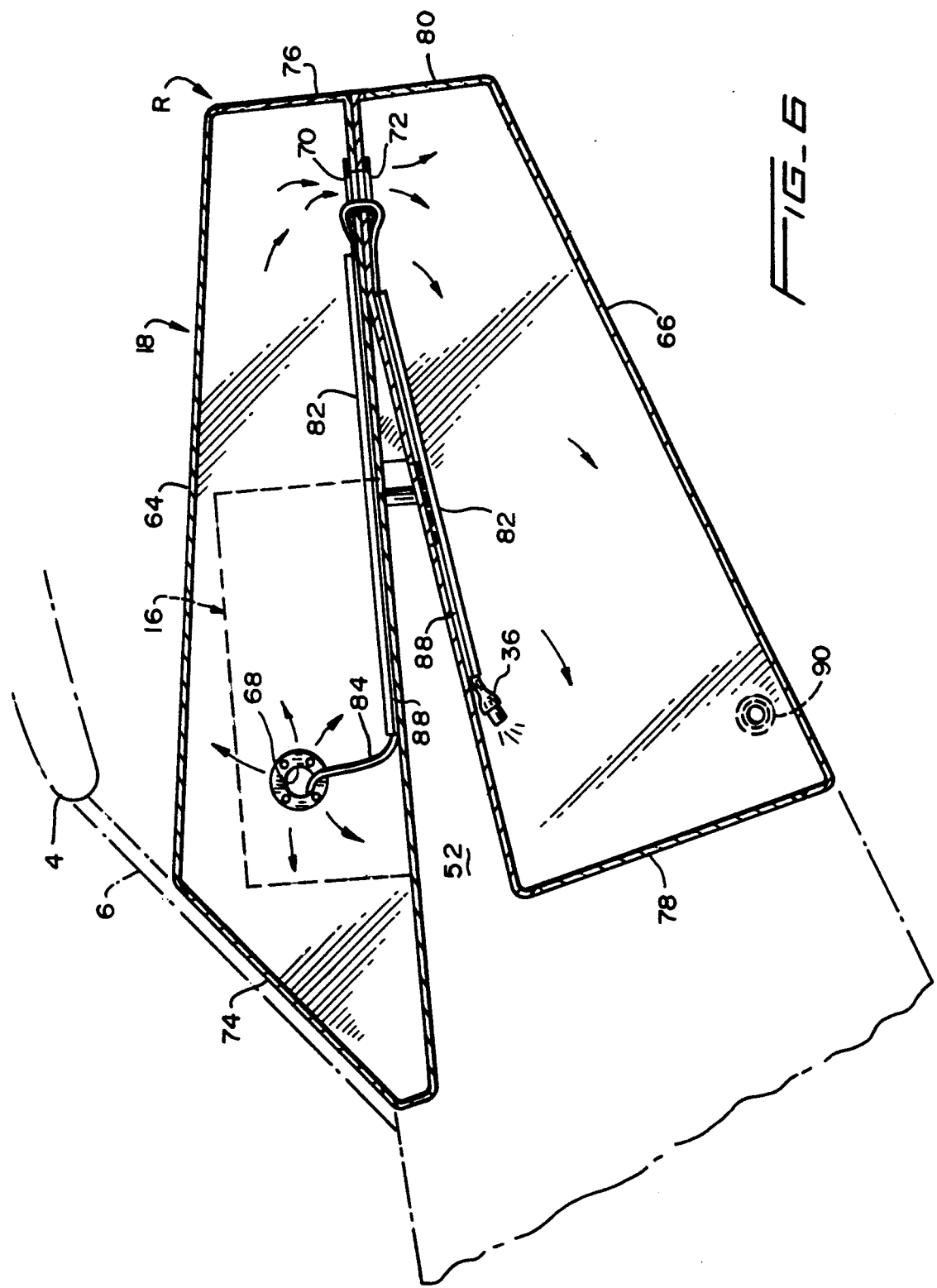

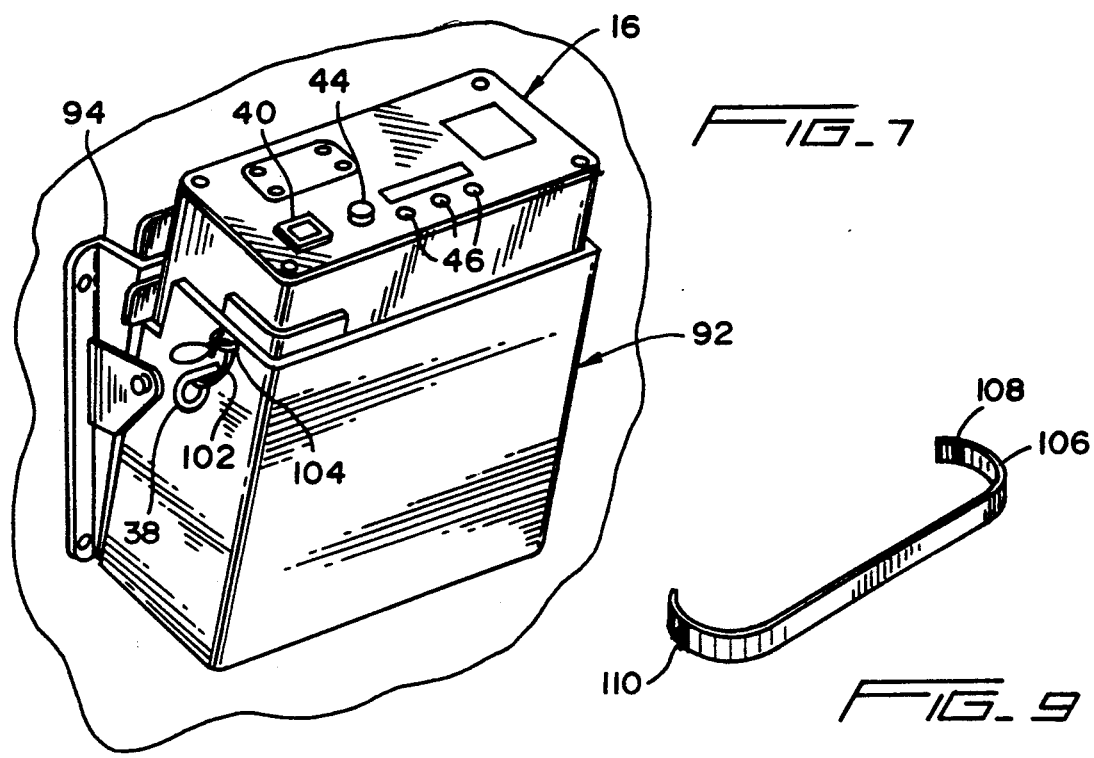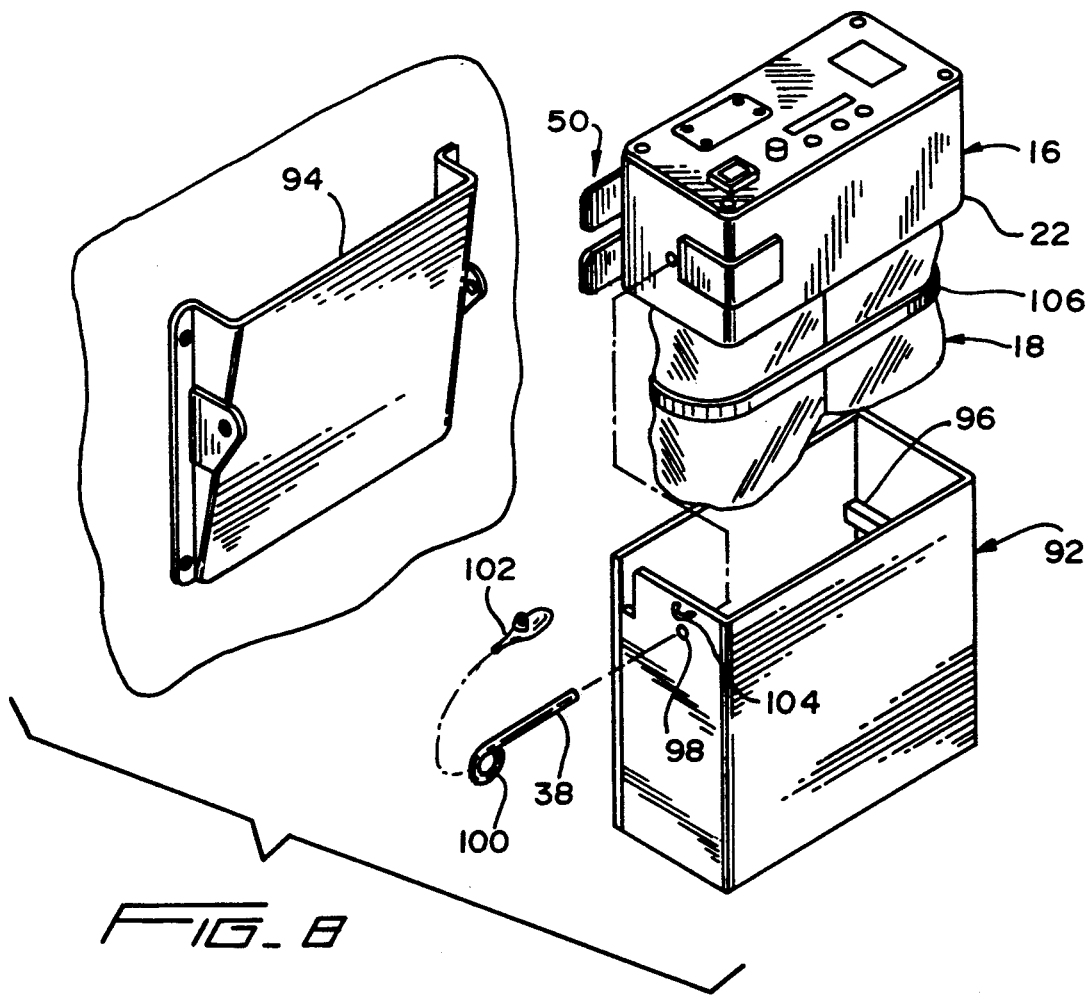

EMERGENCY VISUAL ASSURANCE APPARATUS FOR AN AIRCRAFT COCKPIT

FIELD OF THE INVENTION

The present invention relates generally to an apparatus to enable a pilot to safely guide his aircraft after smoke and/or particulate matter from an on-board fire invades the cockpit area. In particular, the present invention relates to an inflatable enclosure that fills the space between the pilot and the windshield and/or instrument panel along the pilot's line of sight, the enclosure being adapted to permit the pilot to see therethrough to the windshield and/or the instrument panel, thereby providing him with vital information for guiding his aircraft to a safe landing after smoke and/or particulate matter from an on-board fire invades the cockpit area.

BACKGROUND OF THE INVENTION

In the event of smoke or toxic fume emergencies, existing smoke evacuation procedures are intended to aid in safeguarding flight crew vision and breathing. Oxygen masks provide respiratory protection and smoke goggles protection for the eyes. During serious emergencies, when dense vision-impairing smoke greatly exceeds the capacity of even the best smoke equipment or evacuation procedures, flight crews have been unable to see instruments or through the windshield and outside the aircraft. The reason for this is that flight crews have not been provided any emergency equipment assuring vitally important visibility. Incidents and accidents in service have demonstrated the inadequacy of currently provided equipment during severe conditions. Substantial and in some cases complete loss of internal and external visibility has occurred.

There is therefore a need for an apparatus to positively assure pilot visibility of vital instruments and flight path under the most severe flight deck smoke contamination.

OBJECTS AND SUMMARY OF THE INVENTION

It is an object of the present invention to provide a pilot with a capability to view vital instruments and see outside the aircraft in order to safely guide the aircraft to a landing during smoke emergencies.

It is another object of the present invention to provide an apparatus that provides vital visibility for the flight crew by displacing the vision impairing smoke during a smoke emergency by means of transparent inflatable enclosures.

It is still another object of the present invention to provide an emergency vision assurance apparatus that is equipped with a battery powered light source to facilitate reading emergency procedure checklists, approach plates and instruments that may not be illuminated.

It is yet another object of the present invention to provide an emergency vision assurance apparatus that is compact, lightweight, and cost effective, and easy to install, service, maintain and use.

It is an object of the present invention to provide an emergency vision assurance apparatus that provides vital visibility by filtering vision obscuring particulates and aerosols from the contaminated air on the flight deck, which filtered air flows into transparent inflatable enclosures to thereby positively displace the vision impairing smoke for the pilots.

In summary, the present invention provides an emergency vision assurance apparatus to provide a pilot the requisite visibility to view his instrument panel or the outside during a smoke emergency that invades the cockpit, thereby allowing the pilot to safely guide his aircraft to a safe landing.

These and other objects of the present invention will become apparent from the following detailed description.

BRIEF DESCRIPTIONS OF THE DRAWINGS

FIG. 1 is a fragmentary schematic view of an aircraft cockpit, with portions shown in cross-section, showing an apparatus made in accordance with the present invention in a deployed position for assuring the pilot visibility to the instrument panel and to the outside.

FIG. 2 is a perspective view of the apparatus of FIG. 1 in its fully deployed position as viewed from the front of the aircraft.

FIG. 3 is an enlarged, fragmentary, cross-sectional view of the apparatus showing the internal components of the blower unit.

FIG. 5 is a fragmentary, enlarged, cross-sectional view of a clamping means for securing the apparatus to the glare-shield of the aircraft.

FIG. 6 is an enlarged cross-sectional view of the apparatus shown in FIG. 1 in its deployed position.

FIG. 7 is a perspective view of the apparatus shown in a stowed position when not in use.

FIG. 8 is an exploded view of FIG. 7, showing the removal of the apparatus from its stowage container prior to full deployment.

FIG. 9 is a perspective view of a tie-down strap.

FIG. 10 shows the apparatus stowed in a briefcase.

DETAILED DESCRIPTION OF THE INVENTION

Figure 4:
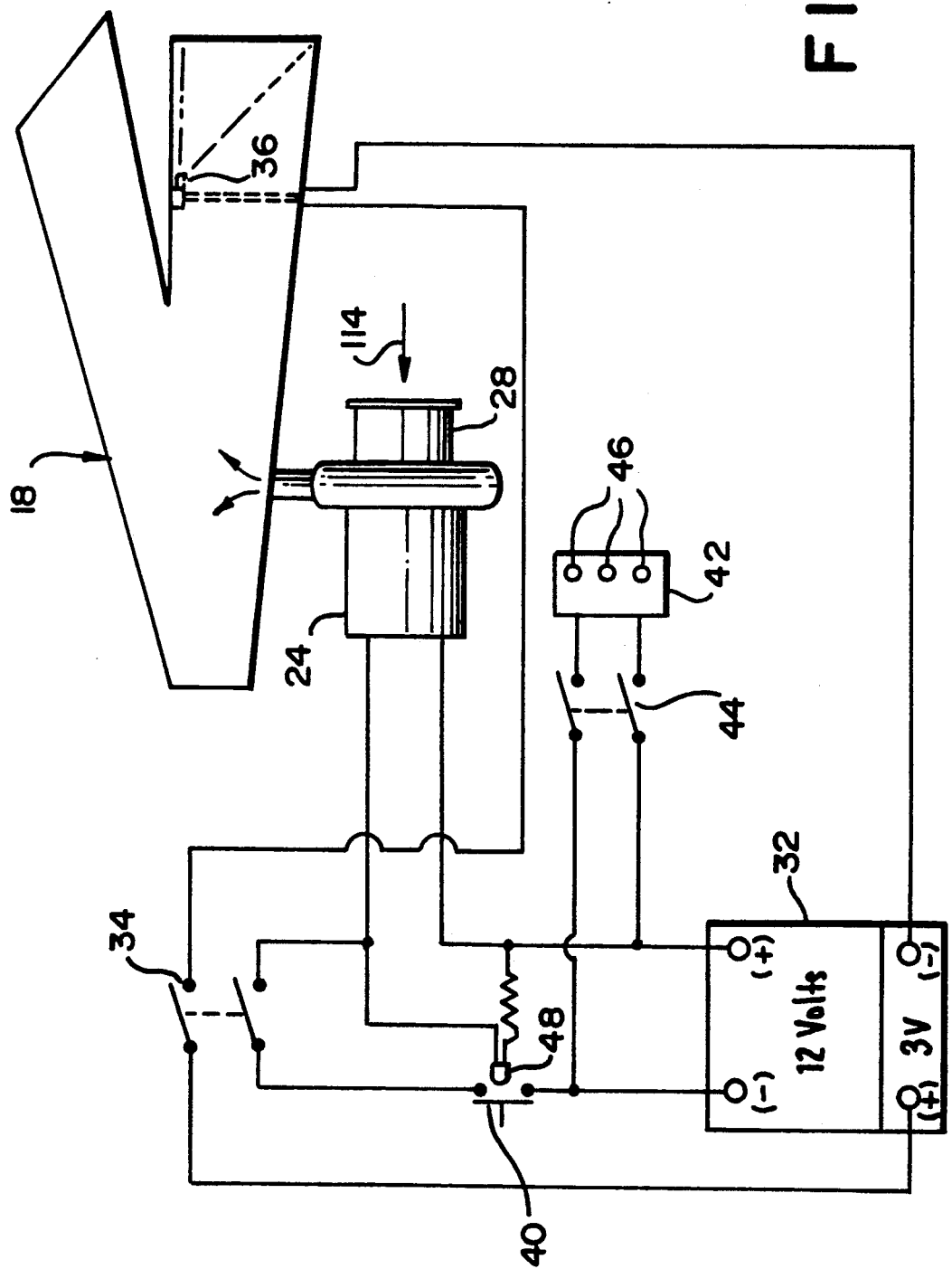
FIG. 4 is a schematic diagram of the apparatus.

An emergency vision assurance apparatus R in accordance with the present invention is disclosed in FIG. 1 in its deployed state within the cockpit 2 of an aircraft 4. The apparatus R is positioned between a windshield 6 and an instrument panel 8 and a pilot 10 to provide the pilot with visual access to the outside of the windshield 6 and to the information provided by the instrument panel 8 during a visibility obscuring smoke emergency. The pilot is shown wearing an oxygen mask 12 for breathing and a pair of eye goggles 14 for eye protection.

The apparatus R includes a power unit 16 and an inflatable vision unit 18 connected to the power unit 16 by a flexible tubing 20, as best shown in FIG. 2. The apparatus R is preferably self-contained, requiring no external source of power.

The power unit 16 has several components disposed within a housing 22 to provide a compact assembly, as best shown in FIG. 3. A blower 24 disposed within the housing 22 has an inlet 26 operably associated with a filter cartridge 28. Holes 29 disposed in a backplate 33 of the housing 22 permit air to flow into the housing 22 when the blower 24 is energized, as best shown in FIG. 2. The blower 24 has an outlet 30 operably connected to the tubing 20 with conventional means, such as a hose clamp 31.

A battery pack 32 is operably connected to the blower 24, as best shown in FIG. 4. A tandem switch 34 is operably connected to the battery pack 32 and the blower 24 and a light 36. The tandem switch 34 has a pivotable arm 35 that is biased against a release pin 38, such that when the release pin 38 is pulled out from the housing 22, the arm 35 is released and actuates the switch 34 to complete the circuit between the battery pack 32 and the blower 24 and the light 36. A person of ordinary skill in the art will understand that other switching mechanisms may be used to activate the apparatus R, such as a switch enclosed in a breakable glass, smoke activated switch, etc.

A main control switch 40 that is accessible from the outside of the housing 22 provides means for disengaging the battery pack 32 from its loads.

A battery tester 42 controlled by a switch 44 accessible from the outside of the housing 22 is provided for testing the integrity of the battery pack 32. LED lights 46, each preferably having a different color, provide information on the conditions of the battery pack 32. Green is preferably used to indicate "Good", yellow to indicate "Replace" and red to indicate "Inoperable".

LED light 46 is operably associated with the main control switch 40 to provide an indication when the blower 24 is energized.

Clamps 50 operably secured to the housing 22 are used to secure the power unit 16 to a glare shield 52 of the cockpit 2, as best shown in FIG. 5. Each of the clamps 50 comprises a tube 54 with a coil spring 56 disposed therein. A slip plug 58 secured to one end of a push rod 60 and disposed within the tube 54 cooperates with the spring 56 to bias the plug 58 and the rod 60 upwardly, as best shown in FIG. 5. A foot plate 62 is operably secured to the other end of the push rod 60, as best shown in FIG. 5.

The power unit 16 is secured to the glare shield 52 by pulling the foot plate 62 away from the housing 22 and against the spring 56, thereby compressing the spring 56. The power unit 16 is then positioned on top of the glare shield 52 such that the glare shield 52 is disposed between the housing 22 and the foot plate 62, permitting the spring 56 to pull the foot plate 62 towards the glare shield 52, thereby exerting a clamping pressure on the glare shield 52.

A person of ordinary skill in the art will understand that other means for securing the apparatus R to the glare shield 52 may be used. For example, Velcro (a registered trademark), other types of clamps, etc. may be used.

The inflatable vision unit 18 comprises a windshield unit 64 and an instrument panel unit 66, as best shown in FIG. 6. A reinforced inlet port 68 connects to the tubing 20 to thereby permit the airflow generated by the blower 24 to fill the interior of the units 64 and 66. An opening 70 at the bottom of the unit 64 and an opening 72 at the top of the unit 66 cooperate with each other to permit the air flowing into the unit 64 to flow into the unit 66.

The windshield unit 64 is a six sided enclosure made of flexible material, such as Teflon (a registered trademark) FEP. Each of the sides of the unit 64 is a quadrilateral figure. A forward surface 74 of the windshield unit 64 includes a transparent, clear sheet material, such as Teflon (a registered trademark) FEP, and is shaped to fit adjacent the windshield 6, as best shown in FIGS. 2 and 6. A rear surface 76 likewise includes a clear, transparent sheet material, such as Teflon (a registered trademark) FEP to permit the pilot to see into the unit 64, through the surface 74 and through the windshield 6. The clear surfaces 74 and 76 function as windows; other arrangements for the same purpose can be used. The unit 64 may be made of transparent material.

The instrument panel unit 66 is also made similar to the unit 64. The unit 66 is a six sided enclosure made of a flexible sheet material, such as Teflon (a registered trademark) FEP. The unit 66 has a forward surface 78 that includes a clear, transparent sheet material, such as Teflon (a registered trademark) FEP, as best shown in FIGS. 2 and 6. The unit 66 has a rear surface 80 that includes a clear, transparent sheet material, such as Teflon (a registered trademark) FEP, as best shown in FIGS. 2 and 6. The unit 66 therefore provides the pilot with clear visibility to the instrument panel. The clear surfaces 78 and 80 function as windows; other arrangements for the same purpose can be used. The unit 66 may be made of transparent material.

Wire channels are each disposed within the units 64 and 66, as best shown in FIGS. 2 and 6, to secure a light cable 84 that feeds the light 36. Each of the wire channels 82 is made of a strip material 86, such as Teflon (a registered trademark) FEP, and heat sealed to the corresponding units 64 and 66 at its longitudinal edges to form a longitudinal pocket 88 through which the cable 84 is threaded, as best shown in FIGS. 2 and 5.

A relief valve 90 is disposed on one side of the instrument panel unit 66.

The apparatus R when not in use is stored in a stowage container 92, as best shown in FIG. 7. The container 92 is mounted within the cockpit 2 by means of a mounting bracket 94, as best shown in FIGS. 7 and 8, such that it is within easy reach of the pilot. The container 92 includes a pair of stop blocks 96, forming a shelf that supports the housing 22 within the container 92. An opening 98 on one side of the container 92 permits the release pin 38 to be disposed within the power unit 16, as best shown in FIG. 3.

A person of ordinary skill in the art will understand that other suitable stowage means may be used for storing the apparatus R when not in use.

The release pin 38 has a loop 100 at its free end that is used to secure a seal 102 to a hook 104 disposed on the container 92.

The inflatable vision unit 18 is secured in its deflated state with a tie-down strap 106, as best shown in FIGS. 8 and 9. The tie-down strap 106 has Velcro (a registered trademark) hook tape 108 disposed at one end and a Velcro (a registered trademark) loop tape 110 disposed at the other end. The hook tape 108 and loop tape 110 cooperate with each other to secure the tie-down strap 106 around the deflated unit 18, as best shown in FIG. 8. The tie-down strap 106 is preferably made from flexible material, such as nylon. A platform 111 secured to the bottom of the housing 22 provides a rigid support surface for the units 64 and 66 when they are tied down by the strap 106 in their deflated state. The strap 106 is secured around the platform 111 and the units 64 and 66 to provide a rigid assembly.

A person of ordinary skill in the art will understand that other means for keeping the units 64 and 66 from inflating after the blower 24 has been activated may be used.

The apparatus R may also be carried and stowed in a briefcase 112, as best shown in FIG. 10. The briefcase embodiment is advantageous for training purposes, where after each use, the whole unit can be readily sent away for maintenance.

The apparatus R disclosed herein is designed for the left hand side of the cockpit 2. A similar apparatus would be needed for the right hand side of the cockpit 2 for the co-pilot and would be substantially a mirror image of the left hand apparatus R.

The power unit 16 may be equipped with a second blower outlet 113 (shown in dashed lines) to serve an inflatable unit at the right hand side of the cockpit 2, in lieu of providing a separate power unit for it.

Although what is disclosed is an apparatus R for use in an aircraft cockpit, the present invention is equally applicable to any similar environment where there is constant monitoring of critically operational instrument panels or other sources of information by an operator and where visibility-obscuring smoke could prevent visual access to such information that could potentially cause danger to property and lives.

A person of ordinary skill in the art will understand that other inflating means for the units 64 and 66 may be used. For example, the apparatus R could obtain its source of clear fluid from the aircraft ventilation system or from a separate bottled gas, etc.

OPERATION

In case of an in-flight smoke emergency, the release pin 38 is pulled out from the housing 22 and the stowage container 92, thereby breaking the seal 102. The apparatus R is then lifted out of the container 92 and secured to the glare shield 52 by means of the clamps 50. The withdrawal of the pin 38 activates the switch 34, thereby powering the blower 24 and the light 36. Air from the cockpit 2 is drawn through the filter cartridge 28 in a direction generally indicated by the arrows 114, as best shown in FIGS. 3, 4 and 6. The filter 28 filters out smoke particles being generated in the cockpit 2 to provide clear air within the inflatable unit 18.

While the apparatus R is being moved from the container 92 to the glare shield 52, the apparatus R remains in a compact configuration, as best shown in FIG. 8, since the strap 106 keeps the unit from inflating. The platform 111 advantageously makes the inflatable unit rigid with the housing 22 for ease of handling. The inflatable unit 18 is preferably made of translucent or transparent material such that the activated light 36 provides some form of illumination to the cockpit in case it is needed.

After the device R is secured to the glare shield 52, the tie down strap 106 is then removed, allowing the windshield unit 64 and instrument panel unit 66 to inflate into their deployed positions, as best shown in FIGS. 1 and 6. The inflatable vision unit 18 inflates automatically. The pilot can assist in unfolding and fitting the units 64 and 66 in their deployed positions.

After the smoke emergency has been controlled or when there is no longer need for the apparatus R, the switch 48 is used to turn off the blower 24 and the light 36. The clamps 50 are removed from the glare shield 52 and the windshield unit 64 and the instrument panel unit 66 are squeezed down to force out the air inside.

During pre-flight check, the condition of the battery pack 32 is checked by depressing the battery tester switch 44. One of the lights 46 will light up, indicating the condition of the battery.

While this invention has been described as having preferred design, it is understood that it is capable of further modification, uses and/or adaptations following in general the principles of the invention and including such departures from the present disclosure as come within known or customary practice in the art to which the invention pertains, and as may be applied to the essential features set forth, and fall within the scope of the invention or the limits of the appended claims.

I claim:

1. An emergency visual assurance apparatus for an aircraft cockpit, comprising:
   a) an inflatable enclosure having inflated and deflated states, said enclosure being adapted to fill the visual path between a pilot and at least one of an instrument panel and a windshield of an aircraft when in said inflated state;
   b) said inflatable enclosure including means for permitting the pilot to see through said enclosure, thereby enabling the pilot a clear path of visibility to the instrument panel or the windshield during a smoke emergency in the cockpit;
   c) means including a housing for inflating said inflatable enclosure with transparent fluid during an emergency to maintain the visual path between the pilot and at least the instrument panel or the windshield;
   d) a member carried in said housing and separable therefrom; and
   e) means associated with said member for activating said inflating means when said member is separated from said housing.

2. An apparatus as in claim 1, and further comprising:
   a) means for stowing said apparatus when not in use.

3. An apparatus as in claim 2, wherein:
   a) said stowing means includes a briefcase.

4. An apparatus as in claim 2, wherein:
   a) said stowing means includes a container secured within the cockpit.

5. An apparatus as in claim 1, wherein:
   a) said inflating means includes a blower unit.

6. An apparatus as in claim 5, wherein:
   a) said member is a release pin; and
   b) a switch operably associated with said pin and said blower unit such that removal of said pin causes said switch to operate said blower unit.

7. An apparatus as in claim 6, wherein:
   a) said switch has an arm biased against said pin such that removal of said pin causes movement of said arm to activate said switch.

8. An apparatus as in claim 6, and further comprising:
   a) a light operably associated with said inflatable enclosure; and
   b) said light is activated when said pin is pulled.

9. An apparatus as in claim 5, wherein:
   a) means for keeping said inflatable enclosure in said deflated state even after said blower unit is energized.

10. An apparatus as in claim 9, and further comprising:
    a) a platform extending from said housing for supporting said enclosure in said deflated state; and
    b) said keeping means is operably associated with said platform.

11. An apparatus as in claim 10, wherein:
    a) said keeping means includes a band disposed around said enclosure in said deflated state and said platform such that said band restrains said enclosure from inflating.

12. An apparatus as in claim 5, wherein:
    a) said blower unit includes a fan adapted to force air from the cockpit into said enclosure; and
    b) a filter disposed upstream of said fan for capturing particulates in the air, thereby permitting clear air to enter said enclosure.

13. An apparatus as in claim 5, wherein:
a) said blower unit includes a battery; and
b) means for testing said battery.

14. An apparatus as in claim 1, wherein:
a) said inflatable enclosure includes first and second enclosures communicating with each other; and
b) said first enclosure is associated with the windshield and said second enclosure with the instrument panel.

15. An apparatus as in claim 14, wherein:
a) said inflating means includes a blower unit; and
b) said blower unit is operably associated with said first enclosure.

16. An apparatus as in claim 15, wherein:
a) said second enclosure includes a relief valve.

17. An apparatus as in claim 14, and further comprising:
a) a light operably associated with said second enclosure.

18. An apparatus as in claim 14, wherein:
a) said first enclosure includes a first end portion shaped to fit adjacent the windshield; and
b) said second enclosure includes a second end portion shaped to fit adjacent the instrument panel.

19. An apparatus as in claim 14, wherein:
a) said first and second enclosures each forms a quadrilateral solid.

20. An apparatus as in claim 1, wherein:
a) said permitting means includes first and second windows operably associated with said enclosure disposed respectively at opposite ends of said enclosure along the line of sight of the pilot.

21. An apparatus as in claim 1, wherein:
a) said enclosure is transparent.

22. An apparatus as in claim 1, wherein:
a) means for securing said inflating means to a glare shield of the cockpit.

23. An apparatus as in claim 22, wherein:
a) said securing means includes a spring biased clamp.

24. An apparatus as in claim 1, wherein:
a) said inflating means includes a first connection to said inflatable enclosure for the lefthand side of the cockpit; and
b) said inflating means includes a second connection for a second inflatable enclosure for the righthand side of the cockpit.

* * * * *